United States Patent [19]
Courtney et al.

[11] Patent Number: 5,682,837
[45] Date of Patent: Nov. 4, 1997

[54] PET BRUSH WORN ON THE HAND

[76] Inventors: Robert E. Courtney, Sunrise Mobile Park #37, Winterset, Iowa 50273; Timothy Zenor, 679 35th St., Des Moines, Iowa 50312; David L. Volk, 301 Oakwood Ct., Clairton, Pa. 15025

[21] Appl. No.: 638,584

[22] Filed: Apr. 29, 1996

[51] Int. Cl.[6] .................................................. A01K 13/00
[52] U.S. Cl. ........................ 119/625; 15/227; 119/632; 119/664
[58] Field of Search ........................ 119/625, 621, 119/611, 600, 612, 664, 613, 618, 652, 632; 15/227, 186, 187, 188, 201, 202, 176.1, 176.6; 132/212; 2/159, 160, 161.2, 161.6

[56] References Cited

U.S. PATENT DOCUMENTS

| D. 268,968 | 5/1983 | Sami | D2/373 |
|---|---|---|---|
| 277,173 | 5/1883 | Thompson | 2/161.6 |
| 1,783,788 | 12/1930 | Hatchett . | |
| 3,167,799 | 2/1965 | McKinley | 15/176.4 |
| 3,651,532 | 3/1972 | Wettburg | 15/186 |
| 3,982,298 | 9/1976 | Ota | 15/106 |
| 4,107,840 | 8/1978 | Kupperman et al. | 15/227 X |
| 4,620,374 | 11/1986 | Patterson | 132/212 X |
| 4,884,374 | 12/1989 | Natale et al. | 15/227 X |
| 4,980,943 | 1/1991 | Barber | 15/227 |
| 5,009,195 | 4/1991 | Damm | 119/633 |
| 5,500,956 | 3/1996 | Schulkin et al. | 2/161.1 |
| 5,524,575 | 6/1996 | Lennon | 119/625 |

FOREIGN PATENT DOCUMENTS 460385  11/1950  Italy ............................. 15/227

OTHER PUBLICATIONS

The Pet & Groom (TM), distributed by Ontel Products, Fairfield, NJ, as shown in the coupon section of the Des Moines Sunday Register dated Jun., Jul. or Aug. of 1994 (coupon section published by Valassis Inserts, Inc., Livonia, MI).
Purebred (TM) Pet Mitt, distributed by Elizabeth Kaye Collection, Cold Spring Harbor, NY, as shown in an advertisement in the USA Weekend Supplement to the Des Moines Sunday Register (supplement dated Oct. 21–23).
Grooming Gloves and Rubber Brushes distributed by Valley Vet Supply, Marysville, KS. p. 40 of 1995 Catalog.

*Primary Examiner*—Gene Mancene
*Assistant Examiner*—Yvonne R. Abbott
*Attorney, Agent, or Firm*—David L. Volk

[57] ABSTRACT

A glove includes at least one resilient pad attached thereto. The pads each include a plurality of pet brush bristles extending outwardly therefrom. In a first embodiment of the pad and bristles, the bristles each have a flattened head at one end thereof. The pad comprises a first layer through which the bristles extend. A second layer is attached to the first resilient layer, such that the flattened head of the bristle is captured between the first resilient layer and the second resilient layer. In a second embodiment of the pad and bristles, the bristles are integrally formed with the pad. In a third embodiment of the pad and bristles, the pad comprises first and second layers as in the first embodiment. A plurality of mushroom-shaped buttons is attached to the second layer. The buttons removably engage with resilient top and inner layers attached to the glove. In a fourth embodiment of the pad and bristles, the bristles are integrally formed with a resilient outer layer. A plurality of mushroom-shaped buttons is attached to the outer layer. The buttons removably engage with the top and inner layers attached to the glove.

5 Claims, 8 Drawing Sheets

PET BRUSH WORN ON THE HAND

BACKGROUND

1. Field of the Invention

This invention relates to pet grooming brushes, specifically to a unique glove which includes bristles for grooming a pet.

2. Description of Prior Art

The grooming of an animal can be a difficult and unpleasant task. Generally, this task is accomplished with brushes made with metal, wood or plastic handles and containing bristles of natural or synthetic materials. Due in part to the rigid, long handles of conventional pet brushes, some areas of an animal's fur can be difficult to reach for grooming. The hard handles with their sometimes sharp edges tend to hurt a squirming animal, which then attempts to escape before a proper grooming job can be accomplished. The person grooming the pet must use one hand to hold the brush, while the other hand is used to hold the animal. If the person drops the brush, he or she may lose his or her grip on the animal in an attempt to pick up the fallen brush.

A pet brush which is worn on the hand would solve these problems. Such a pet brush would eliminate the long, rigid handles which make it difficult to reach all areas of the animal's fur, and which sometimes harm the animal. Because it would not be necessary to hold the brush, both hands could be free to hold or otherwise control the animal as necessary. The person grooming the pet would not have to be concerned with dropping the brush and losing his or her control of the animal.

Pet brushes worn on the hand are known in the prior art. These pet brushes take the form of a mitt, pouch or glove, with bristles mounted thereon. Some take the form of a rigidly backed brush with a strap for wearing on the hand.

Each of these prior art devices is somewhat cumbersome in that they do not allow dexterous movement of the fingers for such actions as holding the animal firmly, or for picking out foreign materials from the animal's fur when necessary during grooming.

It would be desirable to have a pet brush worn on the hand which allows a person to enjoy the tactile sensation of petting the animal's fur with the bare fingers of the hand that is also grooming the pet. None of the prior art devices readily permit this.

It would be desirable to have bristles which are removable from the glove or mitt, in order to clean the bristles separately from the glove or mitt, and in order to permit interchanging different types of bristles for different types of grooming requirements. None of the prior art devices readily permit this.

SUMMARY

The pet brush of the present invention includes a glove having a body portion, four finger pockets and a thumb pocket arranged in a conventional glove-like manner to receive a human hand, fingers and thumb.

Resilient pads are attached to a palm side of the body portion and to a front side of the finger pockets. The pads each include a plurality of pet brush bristles extending outwardly therefrom.

In a second embodiment of the pet brush the finger pockets do not include pads.

In a third embodiment of the pet brush the glove does not include the finger pockets or the thumb pocket. The glove includes structure forming finger openings and structure forming a thumb opening through which the fingers and thumb of the human hand extend when the glove is worn.

In a first embodiment of the pad and bristles, the bristles each have a flattened head at one end thereof. The pad comprises a resilient first layer through which the bristles extend. A resilient second layer is attached to the first layer, such that the flattened head of the bristle is captured between the first layer and the second layer. The pad is attached to the glove such that the second layer is disposed between the flattened heads of the bristles and the glove.

In a second embodiment of the pad and bristles, the bristles are integrally formed with the pad.

In a third embodiment of the pad and bristles, the pad comprises first and second layers as in the first embodiment. A plurality of mushroom-shaped buttons is attached to the second layer. The buttons removably engage with resilient top and inner layers attached to the glove.

In a fourth embodiment of the pad and bristles, the bristles are integrally formed with a resilient outer layer. A plurality of mushroom-shaped buttons is attached to the outer layer. The buttons removably engage with the top and inner layers attached to the glove.

Because the finger pockets do not include pads and bristles in the second embodiment of the pet brush, and because the glove includes structure forming finger openings in the third embodiment of the pet brush, the fingers of the hand are permitted unencumbered movement. This improves the ability of the user to control the animal while grooming, and improves the comfort of the wearer.

In the third embodiment of the pet brush wherein the fingers and thumb of the hand extend through the finger and thumb openings of the glove, the wearer may experience greater tactile pleasure while petting and grooming his or her pet. The wearer will also experience greater comfort.

Because the second layer is disposed between the flattened heads of the bristles and the glove, the wearer's hand is protected from discomfort as the bristles are urged in the direction of the hand due to contact with and pressure from the pet's body.

Because the bristles are removable from the glove, the bristles may be cleaned separately from the glove, and different types of bristles may be interchanged for different types of grooming requirements.

DESCRIPTION OF DRAWINGS

FIG. 7A shows a first embodiment of the pad and bristles.

DETAILED DESCRIPTION

Figure 1:
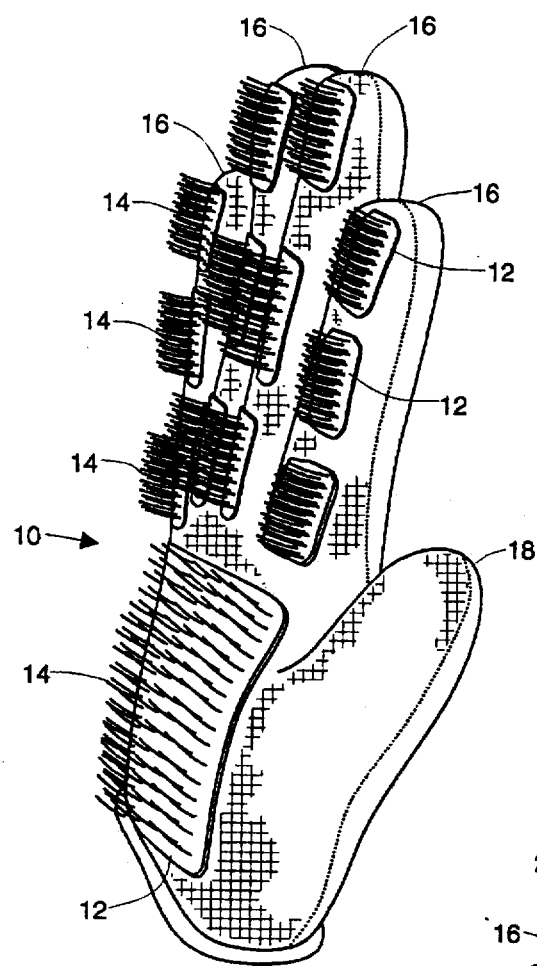
FIG. 1 is a perspective view of a first embodiment of the pet brush.
Figure 2:
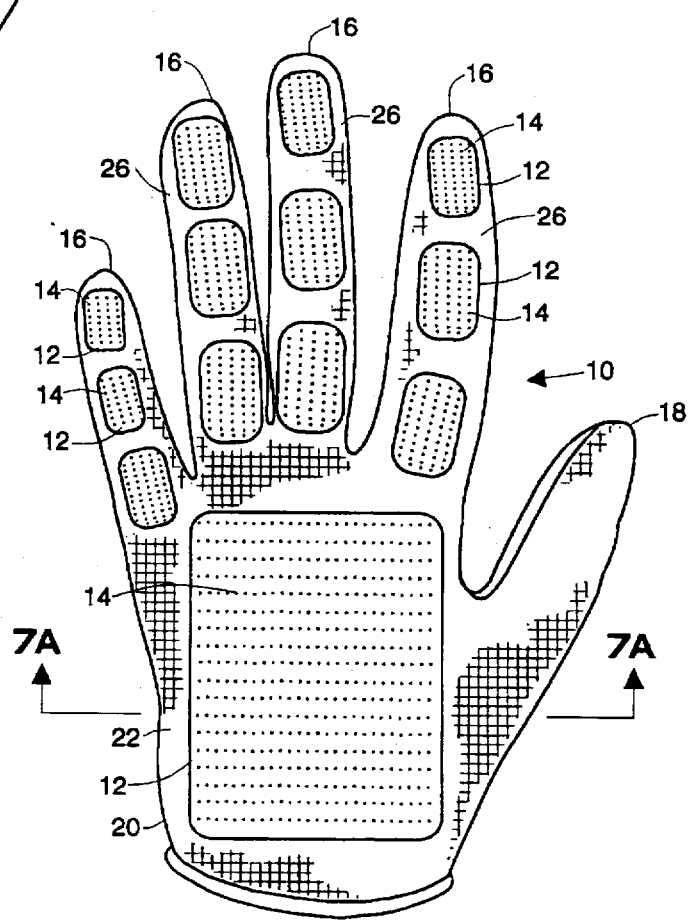
FIG. 2 is a palm-side elevational view of a first embodiment of the pet brush.

FIG. 1 is a perspective view and FIG. 2 is a palm-side elevational view of a first embodiment of the pet brush of the present invention. The pet brush comprises a glove 10 having a body portion 20, four finger pockets 16 and a thumb pocket 18 arranged in a conventional glove-like manner to receive a human hand, fingers and thumb. The glove 10 may be manufactured of any conventional material or combination of materials such as leather, vinyl, rubber, cotton, cotton blend, nylon or the like.

The body portion 20 has a palm side 22, and the finger pockets 16 each have a front side 26. Resilient pads 12 are attached to the palm side 22 of the body portion 20 and to the front side 26 of the finger pockets 16.

The pads 12 each include a plurality of pet brush bristles 14 extending outwardly therefrom.

Figure 3:
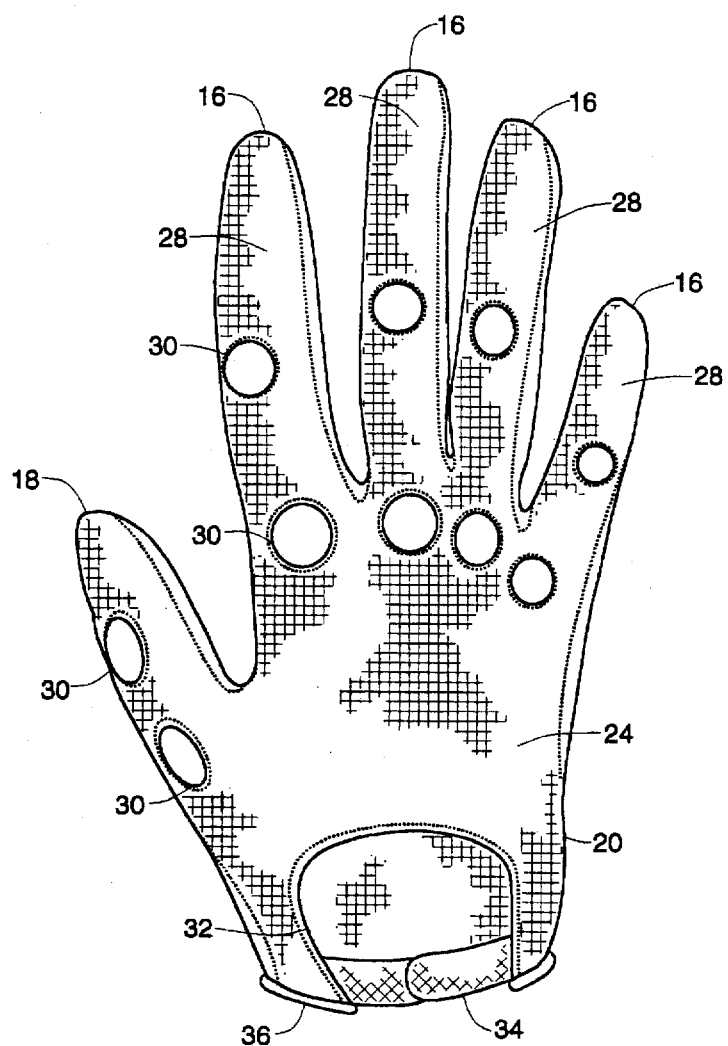
FIG. 3 is a back elevational view of the pet brush.
Figure 4:
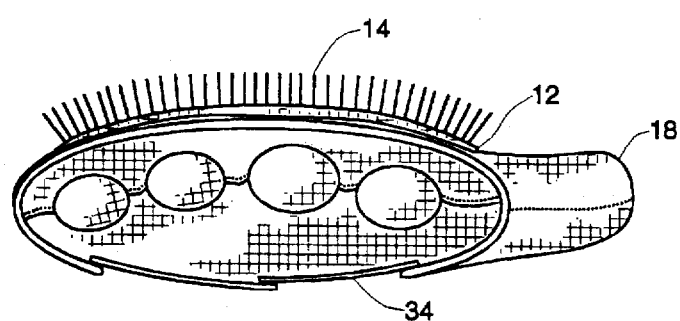
FIG. 4 is an end view of the pet brush.

FIG. 3 is a back elevational view and FIG. 4 is an end view of the pet brush of the present invention. The glove 10 includes structure forming a plurality of joint openings 30 located on a back side 24 of the glove 10 such that the openings 30 would be generally adjacent to each joint of the human hand when the glove 10 is worn. The glove 10 further includes structure forming a back opening 32 in physical communication with a wrist end 36 of the glove 10. A strap 34 located at the wrist end 36 includes a fastener (not shown) of any conventional type such as hook-and-loop, snaps, buttons or buckles.

Figure 5:
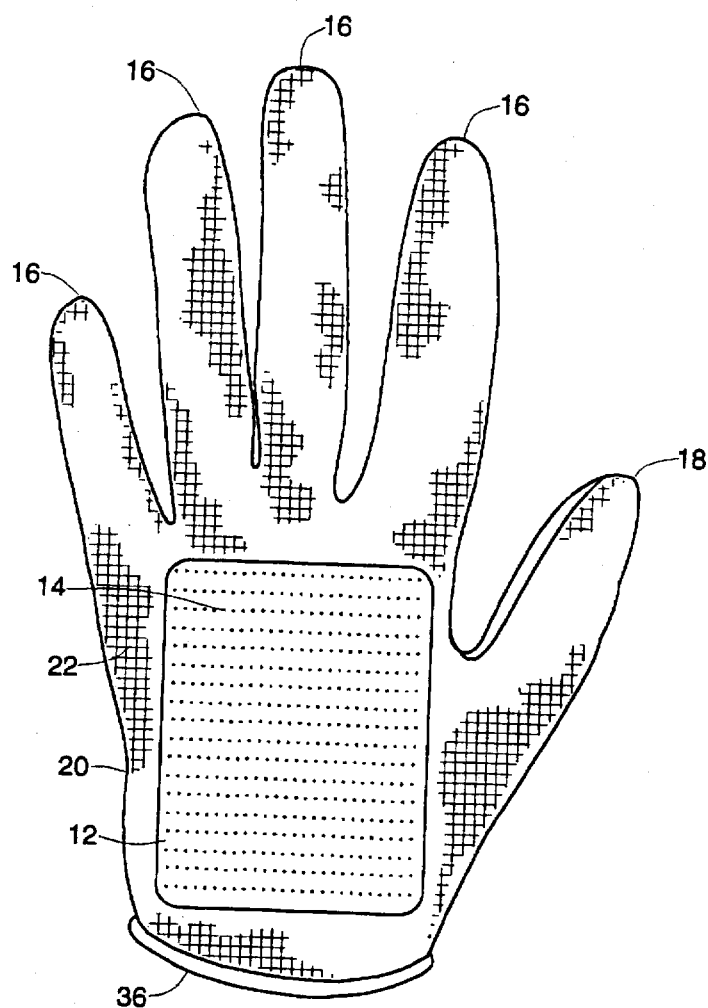
FIG. 5 is a palm-side elevational view of a second embodiment of the pet brush.

FIG. 5 is a palm-side view of a second embodiment of the pet brush, which is similar in all respects to the first embodiment described above and shown in FIGS. 1 through 4, except that the finger pockets 16 do not include pads 12.

Figure 6:
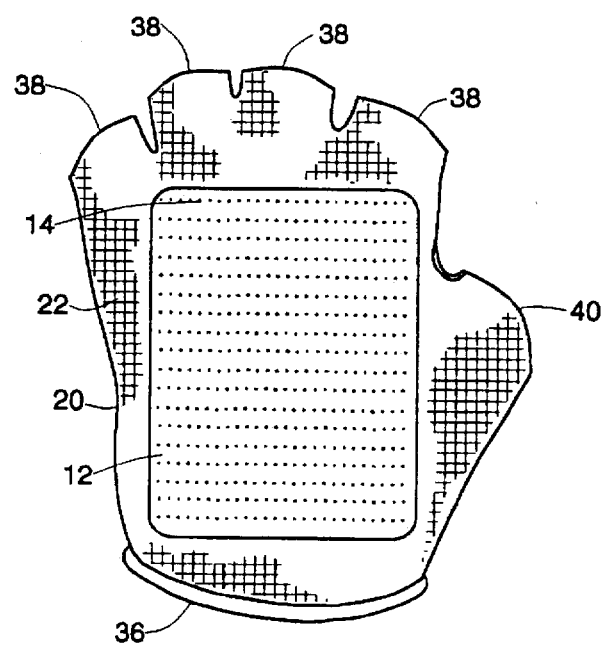
FIG. 6 is a palm-side elevational view of a third embodiment of the pet brush.

FIG. 6 is a palm-side view of a third embodiment of the pet brush which is similar in all respects to the first embodiment described above and shown in FIGS. 1 through 4, except that the glove 10 does not include the finger pockets 16 or the thumb pocket 18. The glove 10 includes structure forming finger openings 38 and structure forming a thumb opening 40 through which the fingers and thumb of the human hand extend when the glove 10 is worn.

Figure 7A:
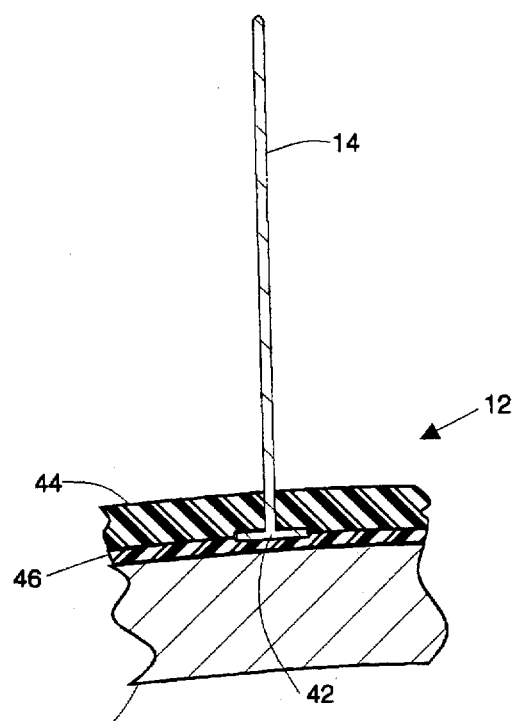
FIG. 7A is a partial cross-sectional view taken along line 7A—7A of FIG. 2.

FIG. 7A is a partial cross-sectional view taken along line 7A—7A of FIG. 2. FIG. 7A shows a first embodiment of the pad 12 and bristles 14. The bristles 14 each have a flattened head 42 at one end thereof. The pad 12 comprises a first resilient layer 44 through which the bristles 14 extend. A second resilient layer 46 is attached to the first resilient layer 44, such that the flattened head 42 of the bristle 14 is captured between the first resilient layer 44 and the second resilient layer 46. The pad 12 is attached to the glove 10 such that the second resilient layer 46 is disposed between the flattened heads 42 and the glove 10. The pad 12 may be attached to the glove 10 by any conventional manner such as adhesive bonding, heat sealing or sewing.

The first resilient layer 44 and the second resilient layer 46 may be made of any conventional resilient material such as rubber or plastic. The bristles 14 may be made of any conventional material such as metal or plastic. The first resilient layer 44 is adhesively bonded to the second resilient layer 46.

Figure 7B:
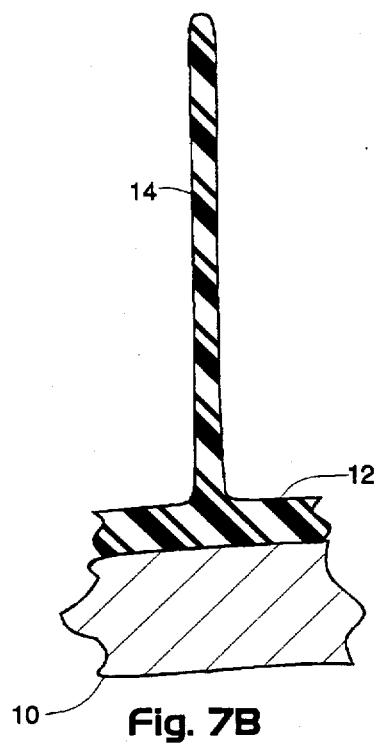
FIG. 7B is a partial cross-sectional view taken along the same line as FIG. 7A, showing a second embodiment of the pad and bristles.

FIG. 7B is a partial cross-sectional view taken along line the same line as FIG. 7A, showing a second embodiment of the pad 12 and the bristles 14. The pad 12 is made of any conventional resilient material such as rubber or plastic, and the bristles 14 are integrally formed with the pad 12. The pad 12 is attached to the glove 10 by any conventional manner such as adhesive bonding, heat sealing or sewing.

Figure 8:
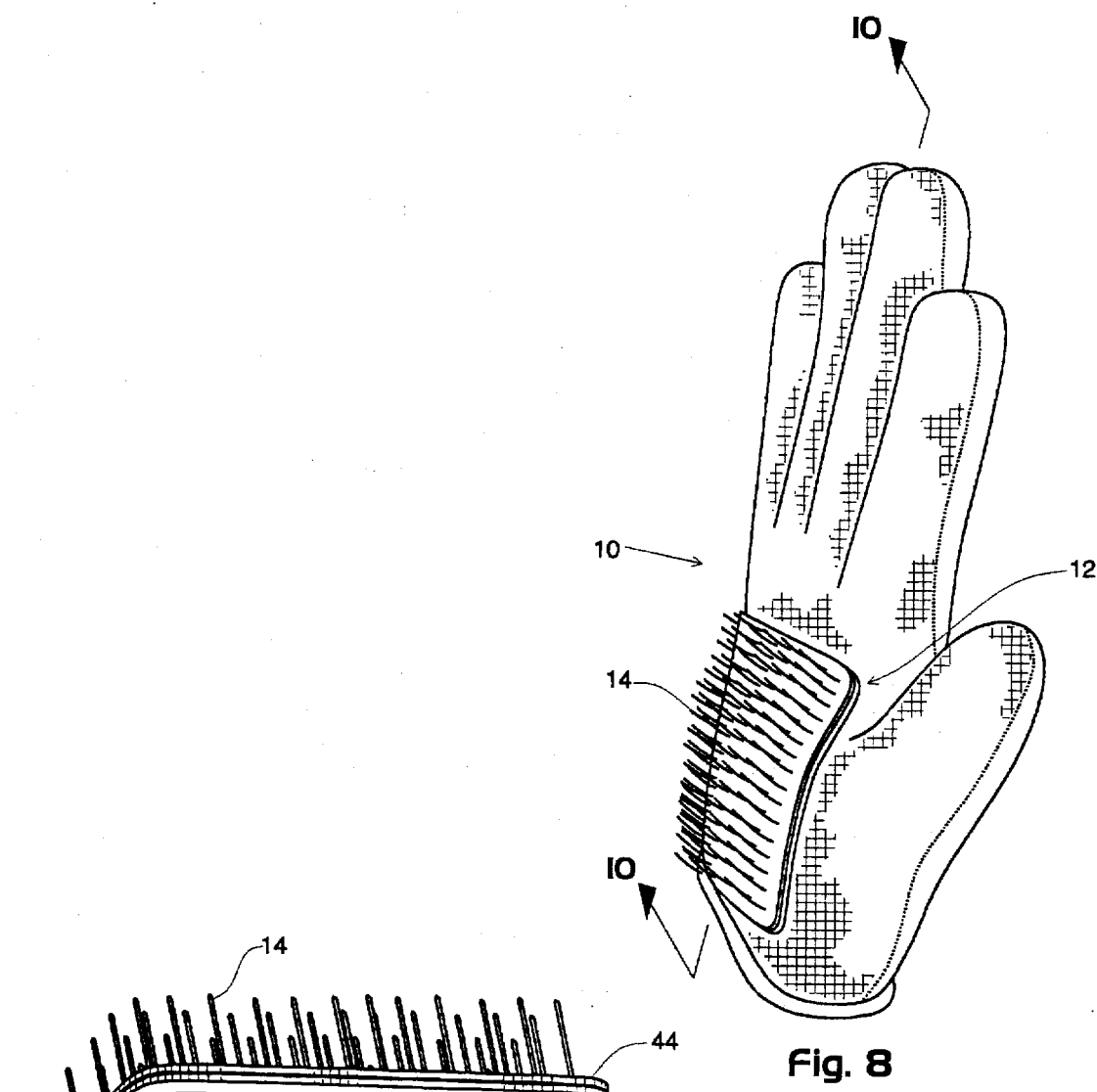
FIG. 8 is a perspective view of the pet brush, showing a third embodiment of the pad and bristles.
Figure 9:
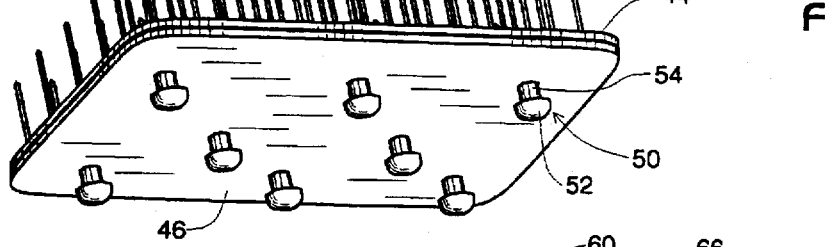
FIG. 9 is a perspective view of the third embodiment of the pad and bristles, showing the bristles removed from the glove.
Figure 9:
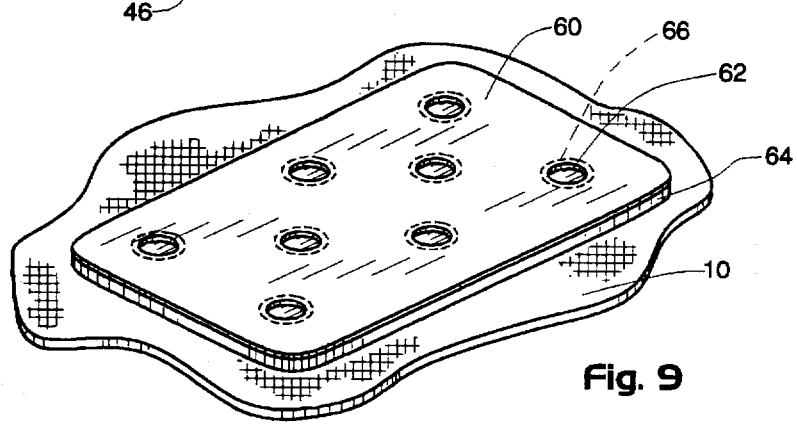
Figure 10:
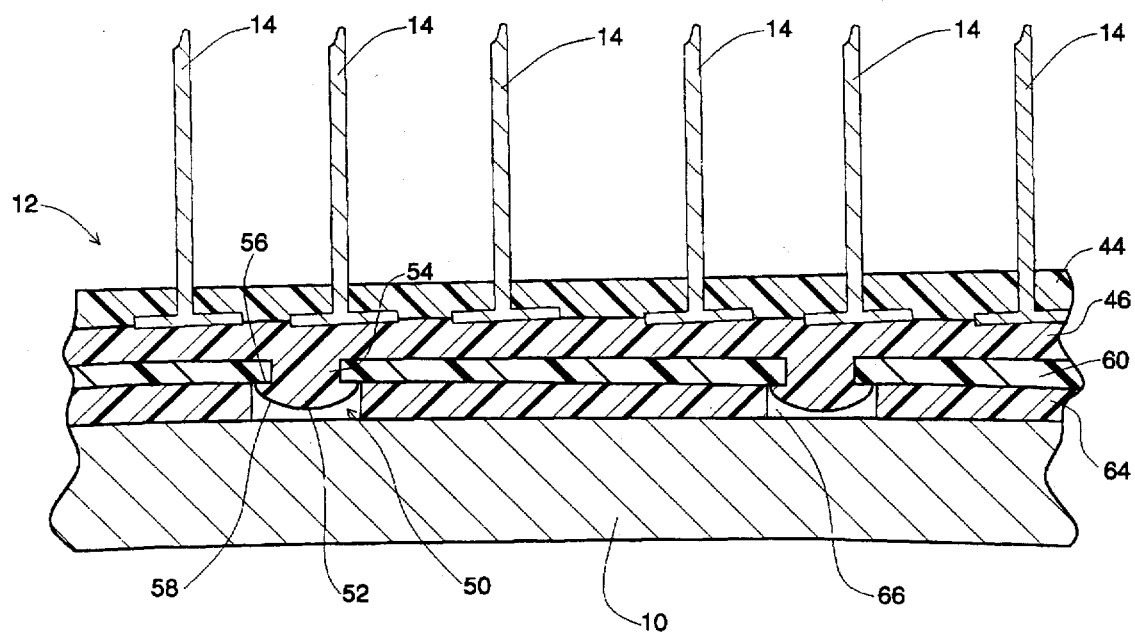
FIG. 10 is a partial cross-sectional view taken along line 10—10 of FIG. 8.

FIG. 8 is a perspective view of the pet brush, showing a third embodiment of the pad 12 and bristles 14. FIG. 9 is a perspective view of the third embodiment of the pad 12 and bristles 14, showing the bristles 14 removed from the glove 10. FIG. 10 is a partial cross-section of the glove 10, the pad 12 and the bristles 14, taken along line 10—10 of FIG. 8. Referring to FIGS. 8, 9 and 10, the pad 12 includes the first layer 44, the second layer 46, and the bristles 14 configured as previously described and shown in FIG. 7A.

A plurality of mushroom-shaped buttons 50 are attached to the second layer 46. Each button 50 includes a cylindrically shaped base 54 extending perpendicularly outward from the second layer 46. Each button 50 includes a head 52 at a free end of said base 54. Each head 52 includes a semi-spherically Shaped surface 58 facing away from the second layer 46 and a flat surface 56 facing the second layer 46.

A resilient top layer 60 includes structure forming a plurality of holes 62 there-through. Each of the holes 62 has a diameter at least as large as the diameter of the base 54 and smaller than the diameter of the head 52.

A resilient inner layer 64 is attached to the top layer 60. The inner layer 64 includes structure forming a plurality of apertures 66 there-through. Each of the apertures 66 has a diameter at least as large as the head 52. The inner layer 64 is attached to the glove 10.

The top layer 60 and the inner layer 64 may be made of any conventional resilient material such as rubber or plastic. The first resilient layer 60 is adhesively bonded to the inner layer 64. The inner layer 64 may be attached to the glove 10 by any conventional manner such as adhesive bonding, heat sealing or sewing.

The holes 62 and the apertures 66 are arranged to line up with the buttons 50 when the second layer 46 is placed adjacent to the top layer 60 such that the buttons 50 face the top layer 60. When configured as described, the first layer 44 and the second layer 66 may be removably attached to the top layer 60, the inner layer 64 and the glove 10 by inserting the buttons 50 through the holes 62 of the top layer 60. The top layer 60 holds the heads 52 in place within the apertures 66 of the inner layer 64.

Figure 11:
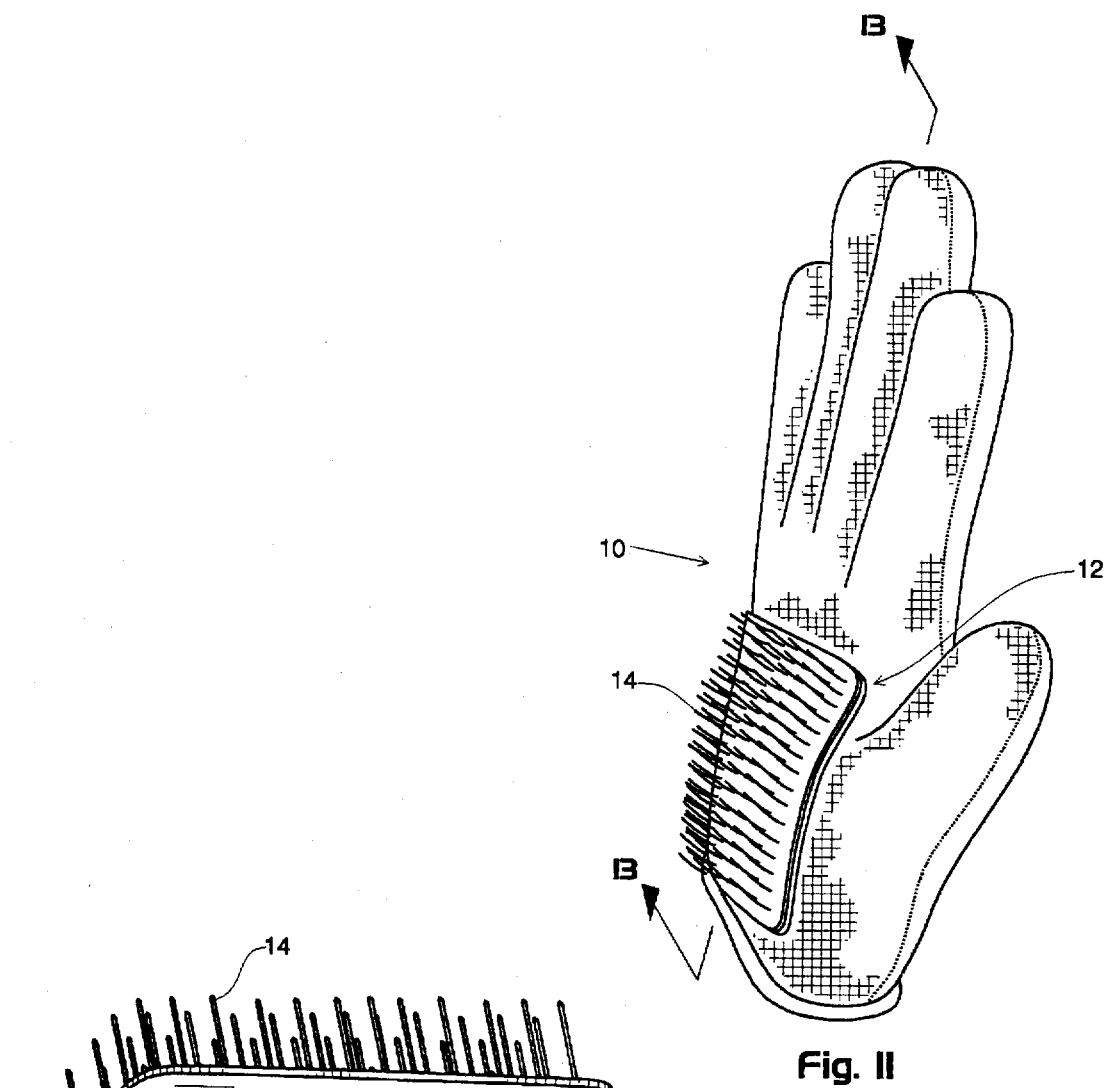
FIG. 11 is a perspective view of the pet brush, showing a fourth embodiment of the pad and bristles.
Figure 12:
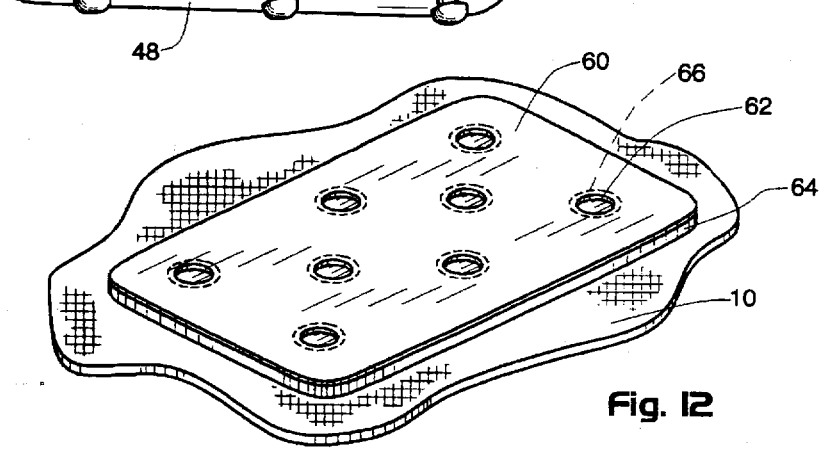
FIG. 12 is a perspective view of the fourth embodiment of the pad and bristles, showing the bristles removed from the glove.
Figure 13:
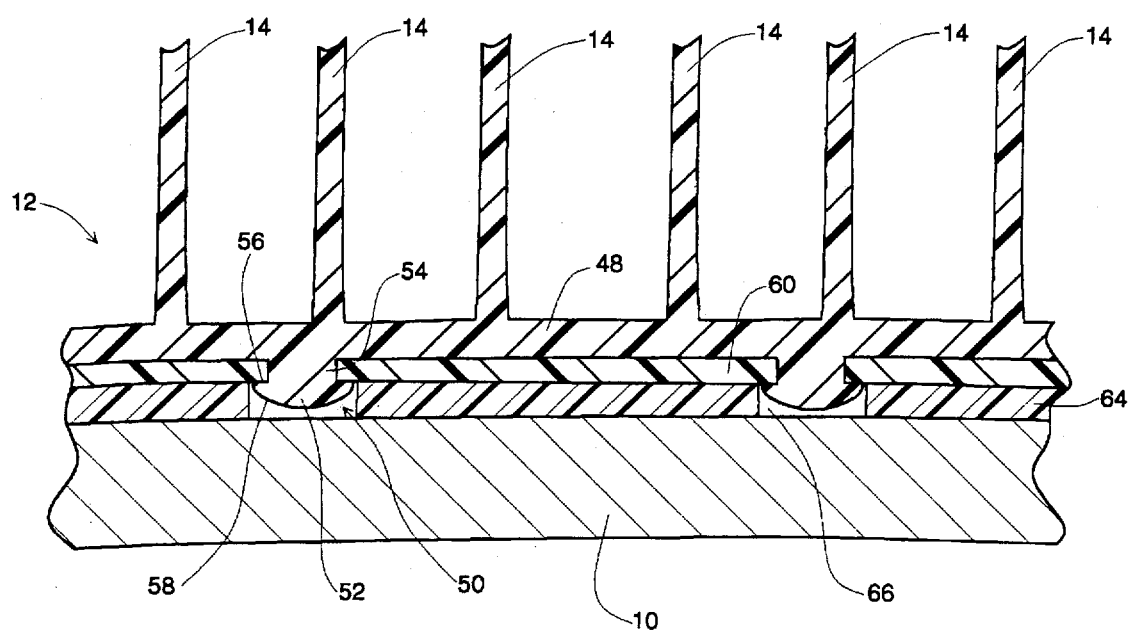
FIG. 13 is a partial cross-sectional view taken along line 13—13 of FIG. 11.

FIG. 11 is a perspective view of the pet brush, showing a fourth embodiment of the pad 12 and bristles 14. FIG. 12 is a perspective view of the fourth embodiment of the pad 12 and bristles 14, showing the bristles 14 removed from the glove 10. FIG. 13 is a partial cross-section of the glove 10, the pad 12 and the bristles 14, taken along line 13—13 of FIG. 11. Referring to FIGS. 11, 12 and 13, the bristles 14 are integrally formed with an outer layer 48.

A plurality of mushroom shaped buttons 50 are attached to the outer layer 48. Each button 50 includes a cylindrically shaped base 54 extending perpendicularly outward from the outer layer 48. Each button 50 includes a head 52 at a free end of said base 54. Each head 52 includes a semi-spherically shaped surface 58 facing away from the outer layer 48 and a flat surface 56 facing the outer layer 48.

The top layer 60, holes 62, inner layer 64 and apertures 66 are configured as previously described and shown in FIG. 9.

The holes 62 and the apertures 66 are arranged to line up with the buttons 50 when the outer layer 48 is placed adjacent to the top layer 60 such that the buttons 50 face the top layer 60. When configured as described, the outer layer 48 may be removably attached to the top layer 60, the inner layer 64 and the glove 10 by inserting the buttons 50 through the holes 62 of the top layer 60. The top layer 60 holds the heads 52 in place within the apertures 66 of the inner layer 64.

Conclusion, Ramifications and Scope

Thus the pet brush of the present invention allows flee movement of the fingers, provides greater comfort and tactile pleasure, protects the hand of the wearer from discomfort as the bristles are urged in the direction of the hand due to contact with and pressure from the pet's body, permits the bristles to removed from the glove for cleaning, and permits different types of bristles to be interchanged for different types of grooming requirements.

While the above description contains many speecifics, these should not be construed as limitations on the scope of the invention, but rather as an exemplification of one preferred embodiment and some alternative embodiments thereof. Many variations are possible. For example: the bristles 14 may be of any shape required for various grooming needs; and the pad 12, finger pockets 16, thumb pocket 18, finger openings 38, and thumb opening 40 may be arranged and configured in various ways.

Accordingly, the scope of the invention should be determined not by the embodiment illustrated, but by the appended claims and their legal equivalents.

The invention claimed is:

1. A pet brush for wearing on a human hand, comprising:
  a. a glove;
  b. said glove having at least one resilient pad attached thereto;
  c. said pad comprising a resilient first panel having bristles extending outwardly therefrom;
  e. said first panel having a plurality of buttons attached to said first panel, said buttons disposed opposite of said bristles;
  f. each button having a stem extending perpendicularly outward from said first panel, each button having a head at a free end of said stem;
  g. said stem having a first width measured parallel to said first panel, said button having a second width measured parallel to said first panel, said first width being smaller than said second width;
  h. said pad further comprising a second panel having structure forming a plurality of openings therein, said openings configured to receive said heads therein, said second panel attached to said glove;
  i. each of said openings including a substantially planar, inwardly depending resilient lip disposed at an entry end of said opening;
  j. said openings arranged to line up with said buttons when said first panel is placed adjacent to said second panel such that said buttons face said second panel, whereby said first panel may be removably attached to said second panel and said glove by inserting said buttons within said openings, said lips holding said heads within said openings.

2. The pet brush of claim 1, wherein each of said buttons is substantially mushroom-shaped.

3. The pet brush of claim 2, wherein said head includes a substantially semi-spherically shaped surface facing away from said first panel, said head having a substantially flat surface facing said first panel.

4. A pet brush for wearing on a human hand, comprising:
  a. a glove;
  b. said glove having at least one resilient pad attached thereto;
  c. said pad having pet brush bristles extending outwardly therefrom;
  d. said bristles each having a flattened head at one end thereof;
  e. said pad comprising a resilient first layer, said bristles extending through said first layer;
  f. said pad further comprising a resilient second layer attached to said first layer;
  g. said flattened heads of said bristles captured between said first layer and said second layer;
  h. a plurality of mushroom-shaped buttons attached to said second layer;
  i. each button having a cylindrically shaped base extending perpendicularly outward from said second layer, each button having a head at a free end of said base, said head having a semi-spherically shaped surface facing away from said second layer, said head having a flat surface facing said second layer;
  j. said pad further comprising a resilient top layer having structure forming a plurality of holes there-through, each of said holes having a diameter at least as large as the diameter of said base and smaller than the diameter of said head;
  k. a resilient inner layer attached to said top layer, said inner layer having a plurality of apertures there-through, each of said apertures having a diameter at least as large as said head, said inner layer attached to said glove;
  l. said holes and said apertures arranged to line up with said buttons when said second layer is placed adjacent to said top layer such that said buttons face said top layer, whereby said first and second layers may be removably attached to said top and inner layers and said glove by inserting said buttons through the holes of said top layer, said top layer holding said heads in place within the apertures of said inner layer.

5. A pet brush for wearing on a human hand, comprising:
  a. a glove;

b. said glove having at least one resilient pad attached thereto;

c. said pad having pet brush bristles extending outwardly therefrom;

d. said pad comprising a resilient outer layer, said bristles integrally formed with said outer layer;

e. said outer layer having a plurality of mushroom-shaped buttons attached to said outer layer, said buttons disposed opposite of said bristles;

f. each button having a cylindrically shaped base extending perpendicularly outward from said outer layer, each button having a head at a free end of said base, said head having a semi-spherically shaped surface facing away from said outer layer, said head having a flat surface facing said outer layer;

g. said pad further comprising a resilient top layer having structure forming a plurality of holes there-through, each of said holes having a diameter at least as large as the diameter of said base and smaller than the diameter of said head;

h. a resilient inner layer attached to said top layer, said inner layer having a plurality of apertures there-through, each of said apertures having a diameter at least as large as said head, said inner layer attached to said glove;

i. said holes and said apertures arranged to line up with said buttons when said outer layer is placed adjacent to said top layer such that said buttons face said top layer, whereby said outer layer may be removably attached to said top and inner layers and said glove by inserting said buttons through the holes of said top layer, said top layer holding said heads in place within the apertures of said layer.

\* \* \* \* \*